US012321418B2

(12) United States Patent
Ramasamy Selvaraju et al.

(10) Patent No.: US 12,321,418 B2
(45) Date of Patent: *Jun. 3, 2025

(54) SYSTEMS AND METHODS FOR CONTRASTIVE ATTENTION-SUPERVISED TUNING

(71) Applicant: Salesforce, Inc., San Francisco, CA (US)

(72) Inventors: Ramprasaath Ramasamy Selvaraju, Atlanta, GA (US); Nikhil Naik, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 1104 days.

This patent is subject to a terminal disclaimer.

(21) Appl. No.: 17/209,013

(22) Filed: Mar. 22, 2021

(65) Prior Publication Data

US 2022/0156592 A1    May 19, 2022

Related U.S. Application Data

(60) Provisional application No. 63/114,484, filed on Nov. 16, 2020.

(51) Int. Cl.
 *G06N 3/045* (2023.01)
 *G06F 17/16* (2006.01)
 *G06F 18/21* (2023.01)
 *G06F 18/214* (2023.01)
 *G06N 3/084* (2023.01)
(Continued)

(52) U.S. Cl.
CPC .......... *G06F 18/2193* (2023.01); *G06F 17/16* (2013.01); *G06F 18/214* (2023.01); *G06N 3/045* (2023.01); *G06N 3/084* (2013.01); *G06N 3/10* (2013.01); *G06T 7/194* (2017.01); *G06V 10/25* (2022.01); *G06V 10/462* (2022.01); *G06T 2207/20084* (2013.01)

(58) Field of Classification Search
CPC ........ G06F 17/16; G06N 3/045; G06N 3/084; G06N 3/10; G06V 10/462; G06T 2207/20084; G06T 2207/20081; G06T 2207/20132
See application file for complete search history.

(56) References Cited

U.S. PATENT DOCUMENTS 10,176,405 B1 *  1/2019  Zhou ..................... H04N 7/181
11,748,988 B1 *  9/2023  Chen ..................... G06F 16/78
                                                 386/241
(Continued)

*Primary Examiner* — Phenuel S Salomon
(74) *Attorney, Agent, or Firm* — Haynes and Boone, LLP

(57) ABSTRACT

Embodiments described herein embodiments described herein provide Contrastive Attention-Supervised Tuning (CAST), a training method to fix the visual grounding ability of contrastive SSL methods based on a data augmentation strategy using unsupervised saliency maps. In addition to the contrastive loss that encourages the model to pick the crop that comes from the corresponding image, CAST provides an explicit grounding supervision through a Grad-CAM based attention loss that enforces models to look at the specified object of interest that is common across different crops when making this decision. A new geometric transform is introduced for randomly cropping different views from an input image based on certain constraints derived from a saliency map.

18 Claims, 13 Drawing Sheets

(51) Int. Cl.
*G06N 3/10* (2006.01)
*G06T 7/194* (2017.01)
*G06V 10/25* (2022.01)
*G06V 10/46* (2022.01)

(56) References Cited

U.S. PATENT DOCUMENTS

| | | | |
|---|---|---|---|
| 2017/0178291 A1* | 6/2017 | Lin | G06T 11/60 |
| 2019/0370608 A1* | 12/2019 | Lee | G06N 3/084 |
| 2020/0167610 A1* | 5/2020 | Hong | G06F 18/217 |
| 2020/0219268 A1* | 7/2020 | Liu | G06V 10/25 |
| 2021/0144442 A1* | 5/2021 | Liu | G06V 20/48 |
| 2021/0150249 A1* | 5/2021 | Zheng | G06V 10/255 |
| 2021/0365707 A1* | 11/2021 | Mao | G06V 10/25 |
| 2023/0087476 A1* | 3/2023 | Liu | G06V 10/24 382/159 |

\* cited by examiner

```
Algorithm 1 Pseudocode of CAST                                                    800 f_query, f_key: Encoder networks for query and key
queue: Dictionary as a queue of K keys (CxK)
# m: momentum
# t: temperature

# Initialize key network (momentum encoder) parameters as query network.
f_key.params = f_query.params

# Load a mini-batch of images and saliency maps of N instances.
for (x, s) in dataloader:
    # Generate saliency-constrained random crops (+ other data augmentations).
    x_q, s_q = aug(x, s)  # For MoCo: x_q = aug(x)                                 } 802
    x_k, s_k = aug(x, s)  # For MoCo: x_k = aug(x)

# -----------------------------------------------------------------
    # Compute MoCo contrastive loss:
    # -----------------------------------------------------------------

# Query and key feature vectors.
    q = f_query.forward(x_q)  #                         shape: (N, C)              } 806
    k = f_key.forward(x_k)    #                         shape: (N, C)
    k = k.detach()            #                         No gradient to keys.

# Positive and negative logits.
    logits_pos = bmm(q.view(N, 1, C), k.view(N, C, 1))  # shape: (N, 1)            } 808
    logits_neg = bmm(q.view(N, C), queue.view(C, K))    # shape: (N, K)

logits = cat[logits_pos, logits_neg], dim=1)  # shape: (N, 1+K)

# MoCo contrastive loss (Positive labels at index 0).
    labels = zeros(N)                                                              } 810
    loss = CrossEntropyLoss(logits/t, labels)

# -----------------------------------------------------------------
    # Compute CAST loss:
    # -----------------------------------------------------------------

# Generate masked key and forward through momentum encoder.
    x_km = mask_op(x_k, s_k)
    km = f_key.forward(x_km)  #                         shape: (N, C)              } 812
    km = km.detach()          #                         No gradient to masked keys.

# Compute dot product between query and masked key.
    dot_prod = bmm(q.view(N, 1, C), km.view(N, C, 1))  # shape: (N, 1)             } 814

# Get activations from conv5 layer of query network.
    conv5_acts = lookup(f_query.params)  #              shape: (N, 7, 7, 2048)
                                                                                   } 816
    # Compute gradients of these conv5 activations wrt this dot product.
    conv5_grads = autograd.grad(dot_prod, conv5_acts)  # shape: (N, 7, 7, 2048)

# Compute Grad-CAM map from these gradients.
    gradcam_map = compute_gradcam(conv5_grads)  #       shape: (N, 7, 7)           } 818

# CAST loss: conv5 Grad-CAM and query saliency map (maximize similarity).
    cast_loss = CosineSimilarityLoss(gradcam_map, resize7x7(s_q))                  } 820
    loss += lambda * cast_loss
    loss.backward()

# SGD update for query network.
    update(f_query.params)                                                         } 822

# Momentum update for key network.
    f_key.params = m * f_key.params + (1 - m) * f_query.params

# Update dictionary (do not add masked keys).
    enqueue(queue, k)  # Enqueue the current minibatch
    dequeue(queue)     # Dequeue the earliest minibatch
```

FIG. 8

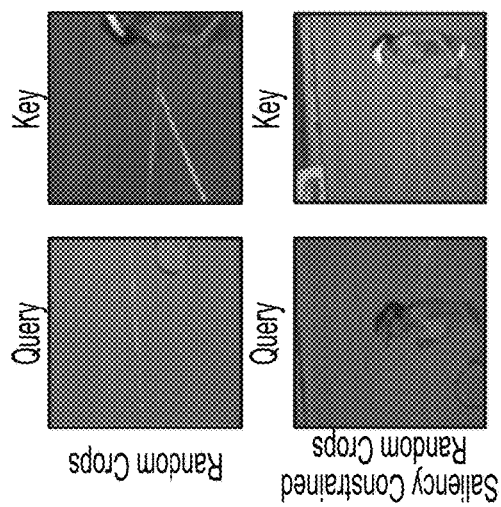
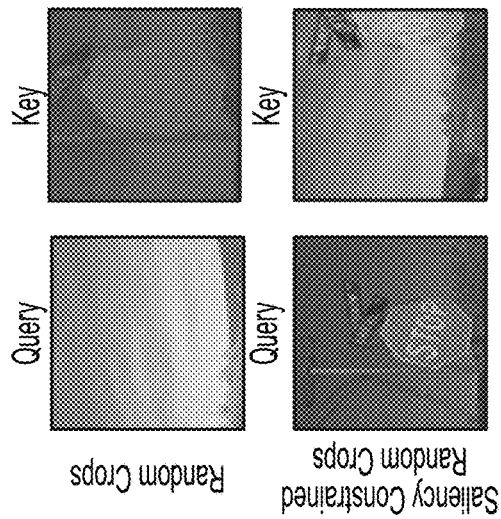
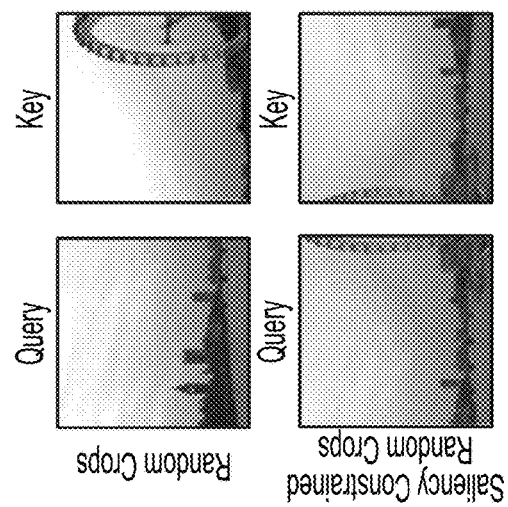
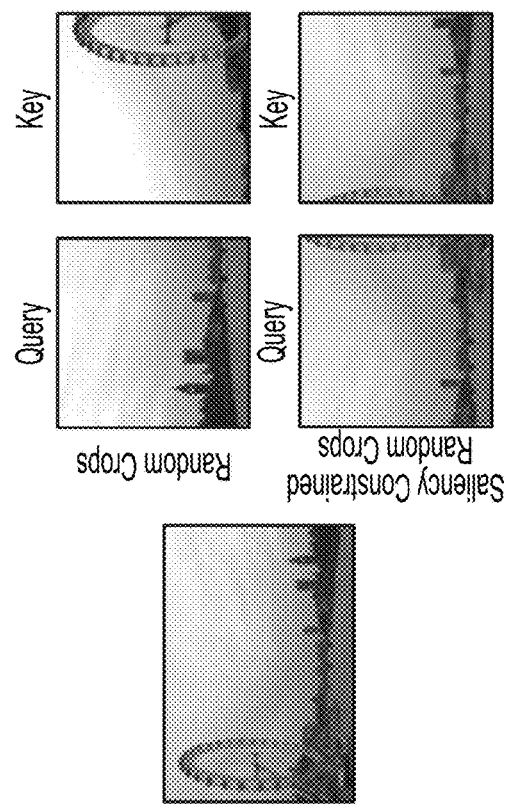
FIG. 9A
FIG. 9B
FIG. 9C
FIG. 9D

| Method | VOC07 clf. mAP | IN-1k clf. Top-1 acc. | PASCAL VOC Detection | | | COCO Instance Segmentation | | | | | |
|---|---|---|---|---|---|---|---|---|---|---|---|
| | | | $AP^{bbox}_{all}$ | $AP^{bbox}_{50}$ | $AP^{bbox}_{75}$ | $AP^{bbox}_{all}$ | $AP^{bbox}_{50}$ | $AP^{bbox}_{75}$ | $AP^{mask}_{all}$ | $AP^{mask}_{50}$ | $AP^{mask}_{75}$ |
| 1) Random Init | – | – | 33.8 | 60.2 | 33.1 | 36.7 | 56.7 | 40.0 | 33.7 | 53.8 | 35.9 |
| 2) ImageNet Fully Sup | – | – | 53.5 | 81.3 | 59.1 | 38.9 | 59.6 | 42.7 | 35.4 | 56.5 | 38.1 |
| 3) MoCo-COCO | 66.9 | 46.5 | 47.5 | 75.4 | 51.5 | 38.3 | 58.7 | 41.5 | 34.9 | 55.7 | 37.2 |
| 4) + Constrained Crop | 69.3 $_{+2.3}$ | 46.0 $_{-0.5}$ | 49.0 $_{+1.5}$ | 77.4 $_{+2.0}$ | 52.4 $_{+0.9}$ | 38.3 $_{+0.0}$ | 58.7 $_{+0.0}$ | 41.6 $_{+0.1}$ | 34.8 $_{-0.1}$ | 55.7 $_{+0.0}$ | 37.2 $_{+0.0}$ |
| 5) + CAST | 73.1 $_{+6.2}$ | 48.7 $_{+2.2}$ | 54.2 $_{+6.7}$ | 80.1 $_{+4.7}$ | 59.9 $_{+8.4}$ | 39.4 $_{+1.1}$ | 60.0 $_{+1.3}$ | 42.8 $_{+1.3}$ | 35.8 $_{+0.9}$ | 57.1 $_{+1.4}$ | 38.6 $_{+1.4}$ |

*FIG. 10*

| Area threshold | $\phi = 0.2$ | $\phi = 0.0$ |
|---|---|---|
| VOC07 | 73.1 | 72.3 $_{-0.8}$ |
| IN-1k | 48.7 | 47.4 $_{-1.3}$ |

(a) Effect of Area threshold $\phi$ (Fixing $\lambda = 3.0$)

| Loss weighing factor | $\lambda = 0.0$ | $\lambda = 1.0$ | $\lambda = 3.0$ | $\lambda = 5.0$ |
|---|---|---|---|---|
| VOC07 | 66.9 | 72.6 $_{+5.7}$ | 73.1 $_{+6.2}$ | 72.4 $_{+5.5}$ |
| IN-1k | 46.5 | 48.7 $_{+2.2}$ | 48.7 $_{+2.2}$ | 47.6 $_{+1.1}$ |

(b) Effect of loss weighing factor $\lambda$ (Fixing $\phi = 0.2$)

| MoCo Projection Layer | 1-layer Linear | 2-layer MLP |
|---|---|---|
| VOC07 | 73.1 | 72.8 $_{-0.3}$ |
| IN-1k | 48.7 | 50.1 $_{+1.4}$ |

(c) Effect of improving underlying MoCo-COCO

| Supervision | VOC07 | IN-1k | PASCAL VOC Detection | | |
|---|---|---|---|---|---|
| | mAP | Top-1 | $AP^{bbox}_{all}$ | $AP^{bbox}_{50}$ | $AP^{bbox}_{75}$ |
| Query | 73.1 | 48.7 | 54.2 | 80.1 | 59.9 |
| Intersection | 72.0 $_{-1.1}$ | 49.4 $_{+0.7}$ | 53.3 $_{-0.9}$ | 79.7 $_{-0.4}$ | 59.0 $_{-0.9}$ |

(d) Effect of suppressing saliency supervision

FIG. 11

| MoCo-COCO Performance | Backgrounds Challenge Setting | | | | | | | |
|---|---|---|---|---|---|---|---|---|
| | Original | Mixed-Same | Mixed-Rand | Mixed-Next | Only-FG | No-FG | Only-BG-B | Only-BG-T |
| Default | 72.62 | 45.73 | 30.44 | 26.86 | 30.42 | 23.95 | 5.06 | 12.62 |
| +Constrained-Crop | 74.79 +2.17 | 52.64 +6.89 | 39.14 +8.70 | 34.17 +7.31 | 33.73 +3.31 | 22.74 −1.21 | 4.10 −0.96 | 11.88 −0.74 |
| +CAST | 77.33 +4.71 | 54.42 +8.67 | 39.93 +9.49 | 37.46 +10.60 | 43.26 +12.84 | 23.70 −0.25 | 4.40 −0.66 | 12.59 −0.03 |

*FIG. 12*

SYSTEMS AND METHODS FOR CONTRASTIVE ATTENTION-SUPERVISED TUNING

CROSS-REFERENCE(S)

The present disclosure is a nonprovisional of and claims priority under 35 U.S.C. 119 to U.S. provisional application No. 63/114,484, filed Nov. 16, 2020.

The present disclosure is related to commonly-owned U.S. nonprovisional application Ser. No. 17/209,011, filed Mar. 22, 2021.

The aforementioned applications are hereby expressly incorporated by reference herein in their entirety.

TECHNICAL FIELD

The present disclosure relates generally to machine learning models and neural networks, and more specifically, to localization learning for self-supervised representations.

BACKGROUND

Deep convolutional neural networks (CNNs) have been widely used in computer vision tasks, e.g., the network is pretrained for image classification using dataset such as ImageNet for finetuning. Example finetuned tasks include object detection, segmentation image captioning and visual question answering. Such computer vision tasks often use supervised learning to pretrain the neural network.

Supervised learning for neural models usually require a large amount of manually annotated training data, which can be time-consuming and expensive. Thus, self-supervised learning (SSL) which aims to learn visual feature representations without any human annotated label has been utilized in the aforementioned downstream tasks. SSL methods that yield competitive performance with supervised learning are mostly based on contrastive learning on the instance discrimination task. These methods train a CNN feature encoder by encouraging feature similarity between two randomly augmented views of an input image (referred commonly as query and positive key), while pulling them apart from other images (negative keys). Existing methods have drawn negative keys in different ways; from images within a batch, memory banks, queues, or cluster prototypes.

While some SSL methods have largely closed the performance gap with supervised pretraining, the reasons for their impressive performance are not well understood. Moreover, these SSL methods have been almost exclusively trained on ImageNet, a well-curated dataset consisting primarily of iconic images. Performance of such SSL methods on downstream tasks suffers when trained on datasets having images of complex, everyday scenes with multiple objects.

Therefore, there is a need to improve self-supervised learning methods for computer vision tasks.

BRIEF DESCRIPTION OF THE DRAWINGS

FIG. 8 is a simplified pseudocode segment illustrating a method for CAST learning through a Grad-CAM based attention loss, according to some embodiments described herein.

FIGS. 9A-9D provide examples of saliency constrained random crops compared with traditional random crops, according to one embodiment described herein.

FIG. 10 provides an example table comparing the transfer learning performance on downstream tasks, according to one embodiment described herein.

FIG. 11 provides example tables illustrating ablation performances of CAST learning, according to embodiments described herein.

FIG. 12 provides an example table illustrating background challenge performance of CAST, according to embodiments described herein.

Figure 1:
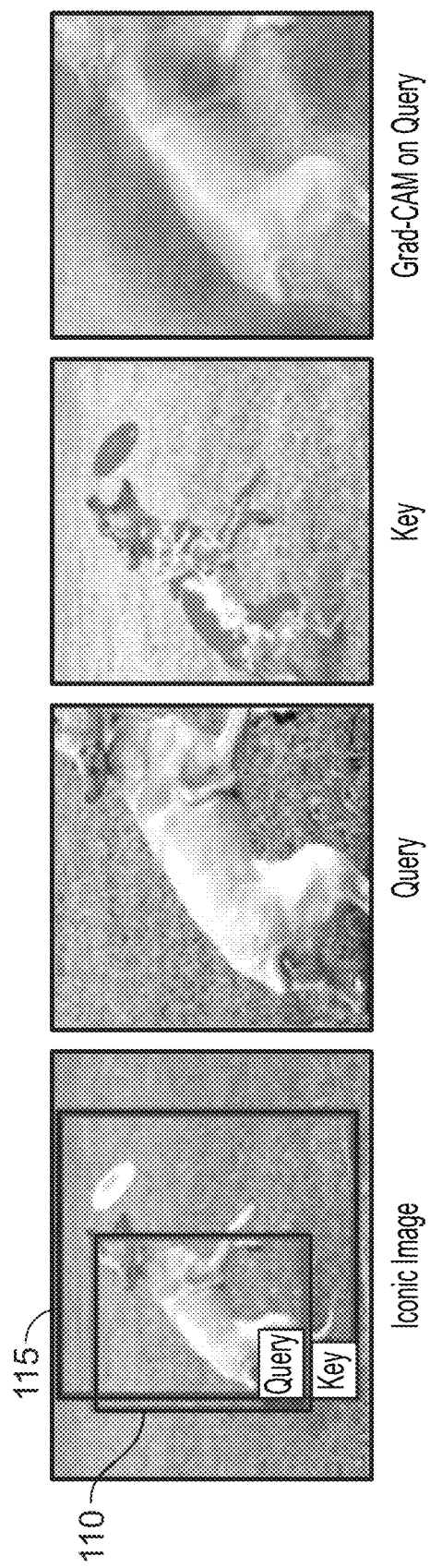
FIGS. 1A-1B show simplified diagrams illustrating various examples showing image sampling issues with existing contrastive SSL approaches, according to one embodiment described herein.

In the figures, elements having the same designations have the same or similar functions.

DETAILED DESCRIPTION

Self-supervised learning (SSL) methods have shown competitive performance with supervised learning in computer vision tasks. However, most existing SSL methods have been almost exclusively trained on ImageNet, a well-curated dataset consisting primarily of iconic images. Attempts to scale these SSL methods on uncurated internet-scale images have shown only marginal improvements despite significantly larger datasets used for training, such as Instagram-1B which is 1000× larger than ImageNet. Moreover, the performance of SSL methods on downstream tasks suffers when trained on datasets of images with complex, everyday scenes with multiple objects, such as COCO, or Places205. For instance, contrastive SSL methods can perform significantly worse on downstream tasks when trained with the Places205 dataset.

In view of the need to improve self-supervised learning methods for computer vision tasks, embodiments described herein provide Contrastive Attention-Supervised Tuning (CAST), a training method to fix the visual grounding ability of contrastive SSL methods based on a data augmentation strategy using unsupervised saliency maps. In addition to the contrastive loss that encourages the model to pick the crop that comes from the corresponding image, CAST provides an explicit grounding supervision through gradient-weighted class activation mapping (Grad-CAM) based attention loss that enforces models to look at the specified object of interest that is common across different crops when making this decision. A new geometric transform is introduced for randomly cropping different views from an input image based on certain constraints derived from a saliency map.

Specifically, a saliency map is generated from a training image, which is used to generate query and key crops and their corresponding saliency maps. The query and key feature representations are obtained with a forward-pass through the encoder network and momentum encoder, respectively. A contrastive loss is computed which pulls the representations of query and key crop together, while pushing the query representation away from other representations in a dynamic queue. Meanwhile, the salient regions in the key crop are passed through the same momentum encoder, and the dot product between query and masked key representation is computed. The gradient of the dot product with respect to the last encoder convolution layer and weigh the forward activation maps to get Grad-CAM map. Finally, an attention loss is computed that encourages Grad-CAM to look at all the salient image regions in the query crop. The encoder network and the momentum network can thus be trained based on the attention loss and the contrastive loss.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

FIGS. 1A-1B show simplified diagrams illustrating various examples showing image sampling issues with existing contrastive SSL approaches, according to one embodiment described herein. Traditionally, contrastive SSL approaches generate the key crop and the query crop from an image sample by random cropping. Augmented views for training these models commonly start with taking random crops from an image. This practice does not encourage semantic understanding, and neural models often cheat by exploiting low-level visual cues or spurious background correlations.

For example, in FIG. 1A, for an iconic image that usually contains a single object, e.g., a dog, different crops that contains part or all of the image region of the visual objects are generated as the query crop 110 and the key crop 115. Contrastive methods can match the resulting key and the resulting query but may use the wrong image regions to do so. The neural model relies on the grass to match the two augmented views of the dog. Following Grad-CAM described in Selvaraju et al., Grad-CAM: Visual explanations from deep networks via gradient-based localization, in proceedings of International Conference on Computer Vision, 2017, which is hereby expressly incorporated by reference herein in its entirety, the model puts high weight on background regions, and low weight on the object of interest.

This strategy may be acceptable for iconic images. However, as shown in FIG. 1B, for images of complex scenes that often contain multiple visual objects, randomly sampled crops such as the key crop 120 and the query crop 125 can have varying contexts, hence providing improper training supervision. The two views 120 and 125 may contain semantically distinct objects (such as the bridge in crop 120 and the chairs in crop 125). The undesirable mapping between the grass in query 125 to the mountain in key 120 may lead to spurious correlations. The Grad-CAM heatmap also shows very little concentration on the visual object in the image. This example may explain diminishing improvements of contrastive SSL models trained on varied web images, and the reduction in their performance when trained with scene images alone.

In view of the inaccuracy of existing contrastive approaches, the Contrastive Attention-Supervised Tuning (CAST) method improves the visual grounding ability of contrastive SSL methods. As described in FIGS. 2-4, CAST includes two algorithmic components: (a) an intelligent geometric transform for cropping different views from an input image, based on constraints derived from an unsupervised saliency map, as further illustrated in FIG. 3; and (b) a Grad-CAM-based attention loss that provides explicit grounding supervision by forcing the model to attend to objects that are common across the crops, as further described in FIGS. 2 and 4.

Figure 2:
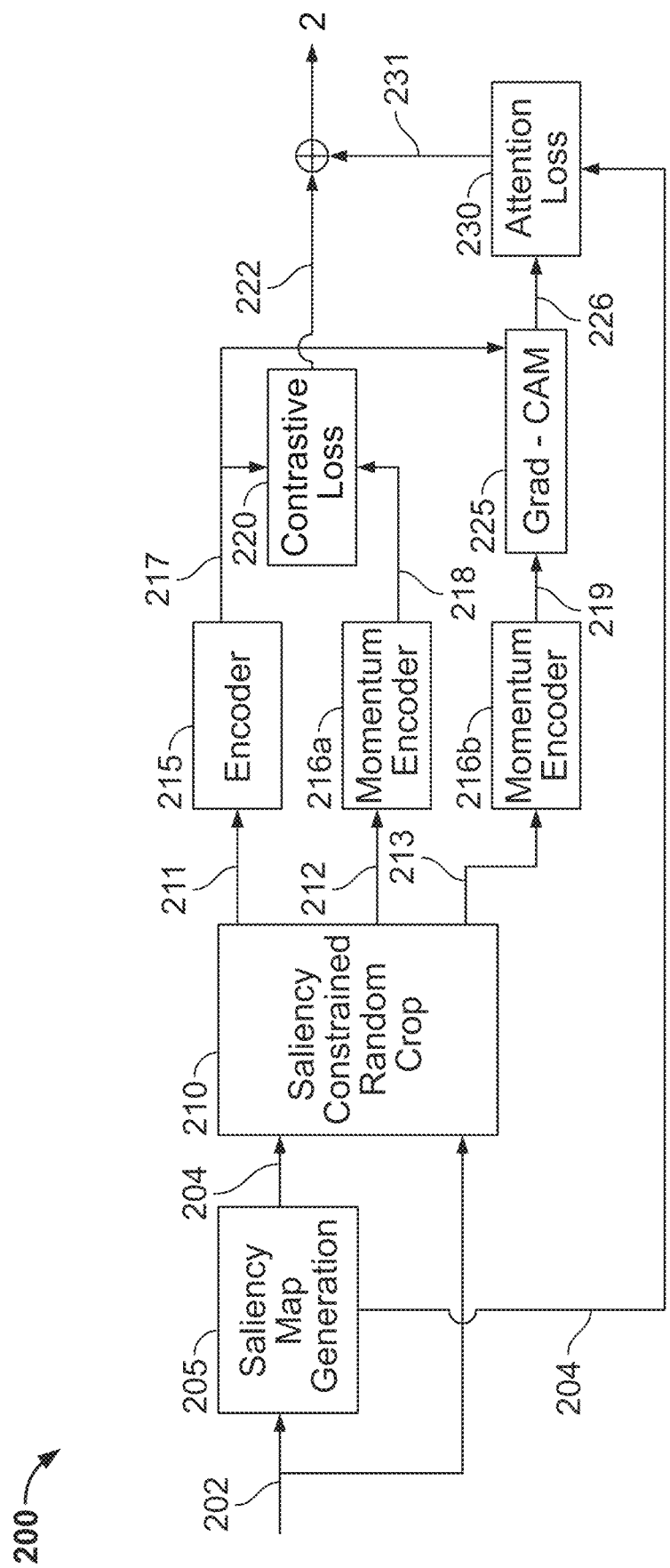
FIG. 2 provides an example block diagram describing an example architecture of the Contrastive Attention-Supervised Tuning (CAST) framework, according to embodiments described herein.

FIG. 2 provides an example block diagram 200 describing an example architecture of the CAST framework, according to embodiments described herein. Diagram 200 shows the CAST framework configured to tune self-supervised models to encourage them to rely on the appropriate regions during contrastive learning. On one hand, the CAST framework includes a saliency map generation module 205 and a saliency constrained random crop module 210, which implement constrained sampling of the query and key crops from the original image 202 based on constraints generated using an image saliency map. On the other hand, the CAST framework implements contrastive learning with a loss that forces the neural model to look at the relevant object regions that are common between the query and key crops through Grad-CAM supervision, through the encoder 215 and two copies of momentum encoders 216a and 216b that are operated in parallel to the encoder 215.

Specifically, an image sample 202 may be received at the saliency map generation module 205, which generates a saliency map 204 of the image sample 202. The saliency map 204 may take a form of a binary mask indicating relevant image regions in the image sample 202. The saliency map 204 may contain all the objects and other important visual concepts present in the image 202. For example, the saliency map generation module 205 may adopt the Deep-USPS as described in Nguyen et al., DeepUSPS: Deep Robust Unsupervised Saliency Prediction via Self-Supervision, in Advances in Neural Information Processing Systems, pp. 204-214, 2019, which is hereby expressly incorporated herein by reference in its entirety, to generate unsupervised saliency maps 204.

The saliency map 204 is sent to the saliency constrained random crop module 210, which generates three randomly sampled crops 211 and 212 in parallel. The random crops 211-212 are all obtained based on the saliency map 204 subject to a crop constrained to overlap with the saliency map to reduce training noise that the queue crop 211 and the key crop 212 may end up containing different objects, or none at all, as shown in FIG. 1. Specifically, the query crop 211 and the key crop 212 may each accompany a respective cropped saliency map corresponding to the crop. Details of the saliency constrained random crop module 210 are further described in relation to FIG. 3.

The generated query crop 211 (denoted by $x^q$) and the key crop 212 (denoted by $x^k$) are sent for contrastive learning. For example, the query crop 211 is sent to an encoder 215, and the key crop 212 is sent to a momentum encoder 216a that is operate in parallel to the encoder 215. In one embodiment, the Momentum Contrastive Encoder (MoCo) described in He et al., Momentum contrast for unsupervised visual representation learning, in proceeding of Computer Vision and Pattern Recognition, 2020, which is hereby expressly incorporated by reference herein in its entirety, may be adopted as the momentum encoder 216a.

In some embodiments, a number of key crops 212 are generated from random crops of a number of images. The number of key crops 212 are stored in a queue such that different (query, key) pairs may be formed. The key crop 212 and the query crop 211 may form a positive pair if they are cropped from the same training image sample. Otherwise, the key crop and the query crop may form a negative pair. A queue of dynamic dictionary of negatives may be built, with a moving-averaged encoder for contrastive learning of representations.

Specifically, the encoder 215 may generate the query feature representation 217 (denoted by q) and the momentum encoder 216a may generate the key feature representation 218 (denoted by k). The contrastive loss module 220 may then compute a contrastive loss 222, denoted by $L_{cont}$, which measures the similarities of the original sample pairs ($x^q$ and $x^k$) in the representation space:

$$L_{cont} = -\log\log\frac{\exp(q \cdot k_+/\tau)}{\sum_{i=0}^{K}\exp(q \cdot k_i/\tau)}$$

where K denotes the number of representations in the queue and $\tau$ denotes the temperature hyperparameter.

On the other hand, the saliency constrained random crop module 210 may also generate a masked key crop 213, which may preserve a visual object in the training image 202 while masking the background of the visual object. The masked key crop 213 is sent to a copy of the momentum encoder 216a, denoted by 216b, to generate a masked key feature representation 219, which is then passed to the Grad-CAM module 225 for computing a gradient map. For example, the query crop $x^q$ 211 is used to query encoder $f^q$ 215. The key crop $x^k$ 212 is then masked with the corresponding saliency map to obtain the salient regions in the key crop 212. This masked key, $x_m^k = x^k * M_k$ is then fed to the momentum encoder 216b, $f^k$. Thus the Grad-CAM module 225 may take a dot-product over the query representation 217, $q = f^q(x^q)$, with the masked key crop representation 219, $k_+^m = f_k(x^k * M_k)$, and each of the other representations in the dynamic queue, and concatenate the resulting dot-products. The Grad-CAM module 225 may then one-hot encode the dot-product for the correct key and compute its gradients with respect to the last convolutional layer activation of the encoder network, $A_{conv5}^{f_q}$, as $$\alpha_q = \sum_{i,j} \underbrace{\frac{\partial q \cdot k_+^m}{\partial A_{conv5\_gradients\ via\ backprop}^{f_q}}}_{global\ pooling}$$

The $\alpha_q$ values indicate the importance of each of the last convolutional layer neurons, n, in the encoder network 215 for matching the query and masked key representation. To get the regions represented by these important convolutional neurons, $\alpha_q$ is used to perform a weighted combination of forward activation maps corresponding to query, $A_{conv5}^{f_q}$, followed by a ReLU to obtain the Grad-CAM map 226:

$$G_q = ReLU\underbrace{\left(\sum_n \alpha_q A_{conv5}^{f_q}\right)}_{linear\ combination}$$

The higher values in the resulting Grad-CAM map indicates query regions which the network relies on when mapping the masked key regions, $x^k * M_k$, to the entire query crop, $x^q$. The heatmaps form the basis for enforcing attention supervision. Specifically, the attention loss module 230 may receive the Grad-CAM map 226 and compute an attention loss 231. The attention loss 231 measures the similarity of Grad-CAM heatmap 226 to its corresponding saliency map $M_q$ 204:

$$L_{att} = 1 - \frac{G_q \cdot M_q}{\|G_q\|\|M_q\|}.$$

Thus, the computed contrastive loss 222 and the attention loss 231 may be combined to result in an overall loss $$L_{CAST} = L_{cont} + \lambda L_{att}.$$

The total loss may be used to update the encoder 215, and/or the momentum encoder 216a via backpropagation. Specifically, the attention loss 231 encourages the network to base predictions on the correct regions and the contrastive loss 222 encourages the network to actually make the right prediction. Note that $A_{conv5}^f$'s $q$ is a function of all the encoder parameters until last convolution layer and $\alpha_q$ is a function of the layers from the last convolutional layer until the final fully-connected layer, and the key encoder features. The keys, k and $k_m$, are detached from the encoder 215, and therefore gradients do not get passed through them. Hence, while Grad-CAM is a function of the both the query and the key encoder weights, during the update through an optimization algorithm, only the weights on the query encoder 215 are updated. The key encoder 216a-b may be a moving average of the query encoder 215, and thus the key encoder weights get updated eventually during training.

Figure 3:
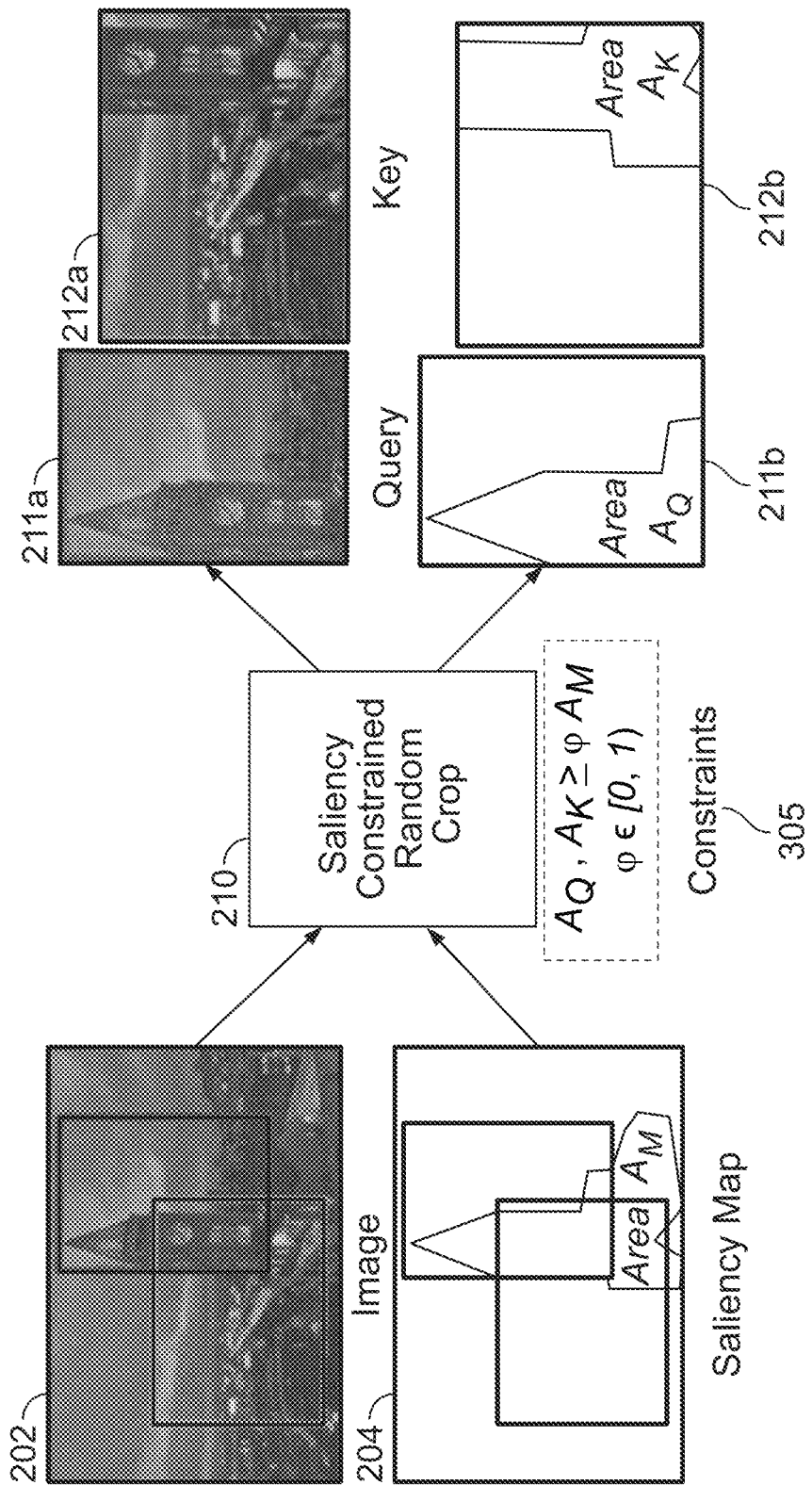
FIG. 3 provides an example block diagram illustrating an example cropping mechanism of saliency constrained random crop module in FIG. 2, according to embodiments described herein.

FIG. 3 provides an example block diagram illustrating an example cropping mechanism of saliency constrained random crop module 210 in FIG. 2, according to embodiments described herein. For example, the input image 202, denoted by I with height h and width w may be sampled by the saliency constrained random crop module 210 into two independent random crops (query and key) for input to the model. The saliency map 204 of the image 202 is denoted by $M \in \{0,1\}^{h \times w}$, where $M_{ij}=1$ indicates pixel (i, j) is salient, and area of salient region is $A_M = \Sigma_{i,j} M_{i,j}$.

The saliency constrained random crop module 210 may then sample random crops based on a constraint 305 specified by a hyperparameter $\phi \in [0, 1)$: the area of saliency map M covered by each crop must be at least $\phi \times A_M$. $\phi$ is the area-overlap threshold. Higher values of $\phi$ imply stricter constraints—enforcing higher over-lap between sampled crops and salient regions, whereas set-ting $\phi=0.0$ recovers the unconstrained random crops.

Thus, the area-overlap constraint 305 provides that both the query and key crops 211 and 212 contain some salient regions, and the neural models may focus on the salient regions during training to improve visual grounding.

In one embodiment, when contrastive models are given multiple crops from an image, focusing on the salient (object) regions in the crops would make them learn representations that are more generalizable. These models are likely to be more grounded, and are thus less likely to learn unwanted biases. Now that the two crops, query 211a and key 212a are generated, which are passed to the encoder 215 and momentum encoder 216a in parallel as shown in FIG. 2, their representations are trained to be pulled closer compared to the other representations in a large dynamic queue. The random cropping transformations used to obtain the query and key crop can also be applied to the image-specific saliency map 204. This results in two corresponding saliency maps $M_q$ 211b and $M_k$ 212b, each containing the salient object regions in the query crop 211a and key crop 212a.

In one embodiment, the entirety of the object may not exist in both the query crop 211a and the key crop 212a. Hence, when considering the saliency map corresponding to the query 211a, Mq, there can be cases where only a part of the salient region in the query 211a exists in the key 212a. In such scenarios, all the regions in the query crop 211a that correspond to the salient regions in the key crop 212a are considered. For example, the lower building in the bottom left corner of the key crop 212a does not exist in the query crop 211a, while the top of the tower shown in the query crop 211a does not exist in the key crop 212a. In such cases, the saliency map 211b corresponding to the query 211a would contain all regions in the key 212a that contain the tower building.

Thus, the saliency-map based cropping method may improve object localization ability of contrastive SSL feature representations on scene images and on downstream image classification tasks. In this way, CAST can enable self-supervised learning from unconstrained web-scale datasets containing images with complex interactions of multiple objects and lead to better out-of-distribution performance and greater robustness to contextual bias.

Figure 4:
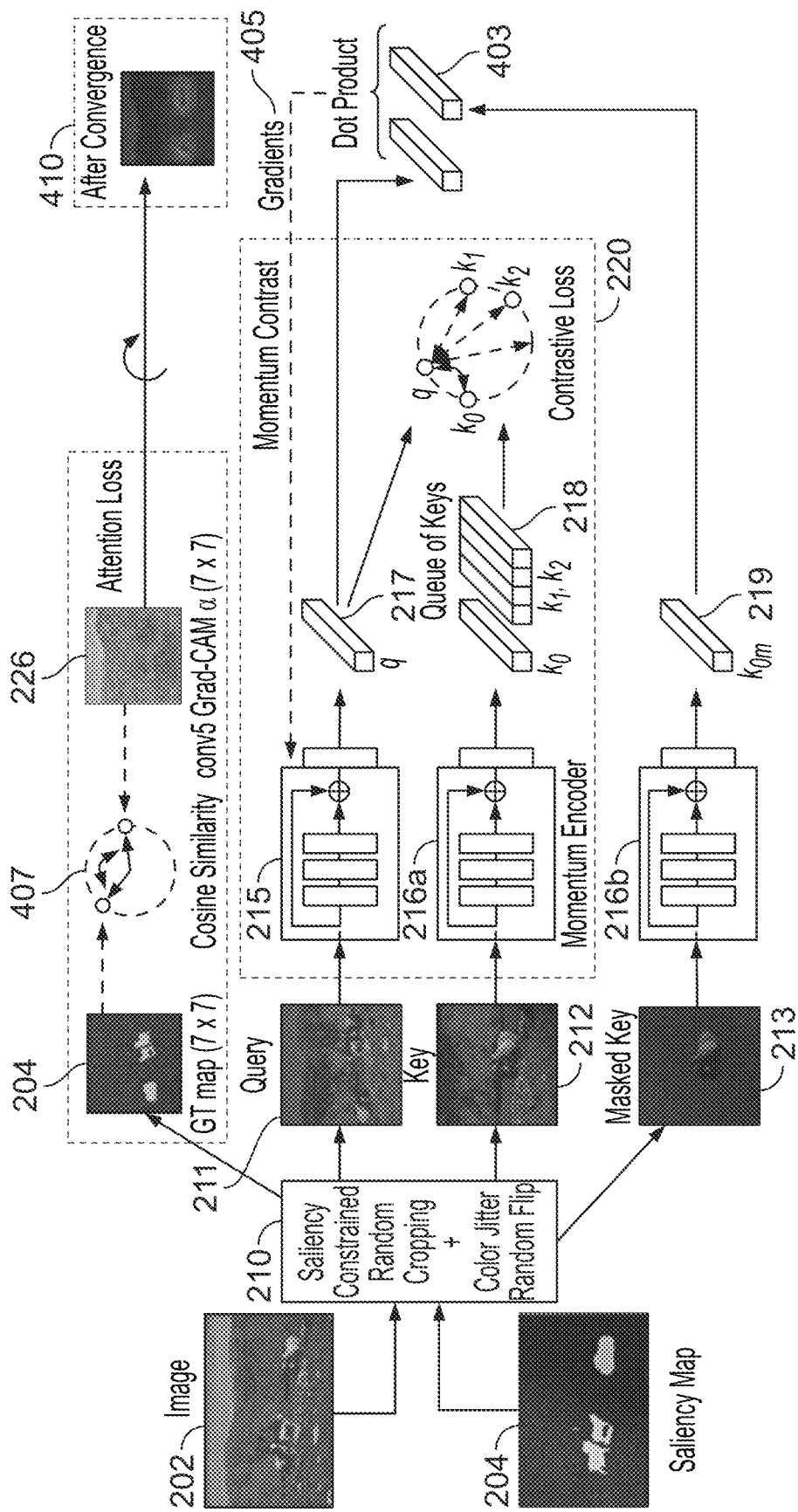
FIG. 4 provides an example diagram providing visualized example of the CAST framework shown in FIG. 2, according to embodiments described herein.

FIG. 4 provides an example diagram providing visualized example of the CAST framework shown in FIG. 2, according to embodiments described herein. For example, the training image 202 may contains a view of several sheep, and the saliency map 204 may indicate the image regions that contain the sheep. The saliency constrained random cropping module 210 may generate a query crop 211 that has cropped the original image 202 to focus on the three sheep, while the key crop 212 includes two sheep from the original image. The masked key crop 213 shows the two sheep while masking the background of the two sheep.

The momentum encoder 216a generate a queue of key representations 218, which are compared with the queue representation 217 in the feature space. For example, the contrastive loss 220 pulls together the query representation and the key representation that are generated from the same image sample.

A dot-product 403 of the query representation 217 and the masked query representation 219 is computed. The gradients 405 of the dot-product 403 are used to compute the Grad-CAM gradient map 226, which is compared with the saliency map 204, based on the cosine similarity 407. The attention loss 231 may penalize errors in the predicted Grad-CAM map based on cosine distance—emphasizing alignment over magnitude. Eventually, during training, the Grad-CAM map 226 may converge to highlighted areas that identify the salient regions, e.g., the after-convergence map 410 shows the regions where the sheep are supposed to be in the saliency map 204.

Figure 5:
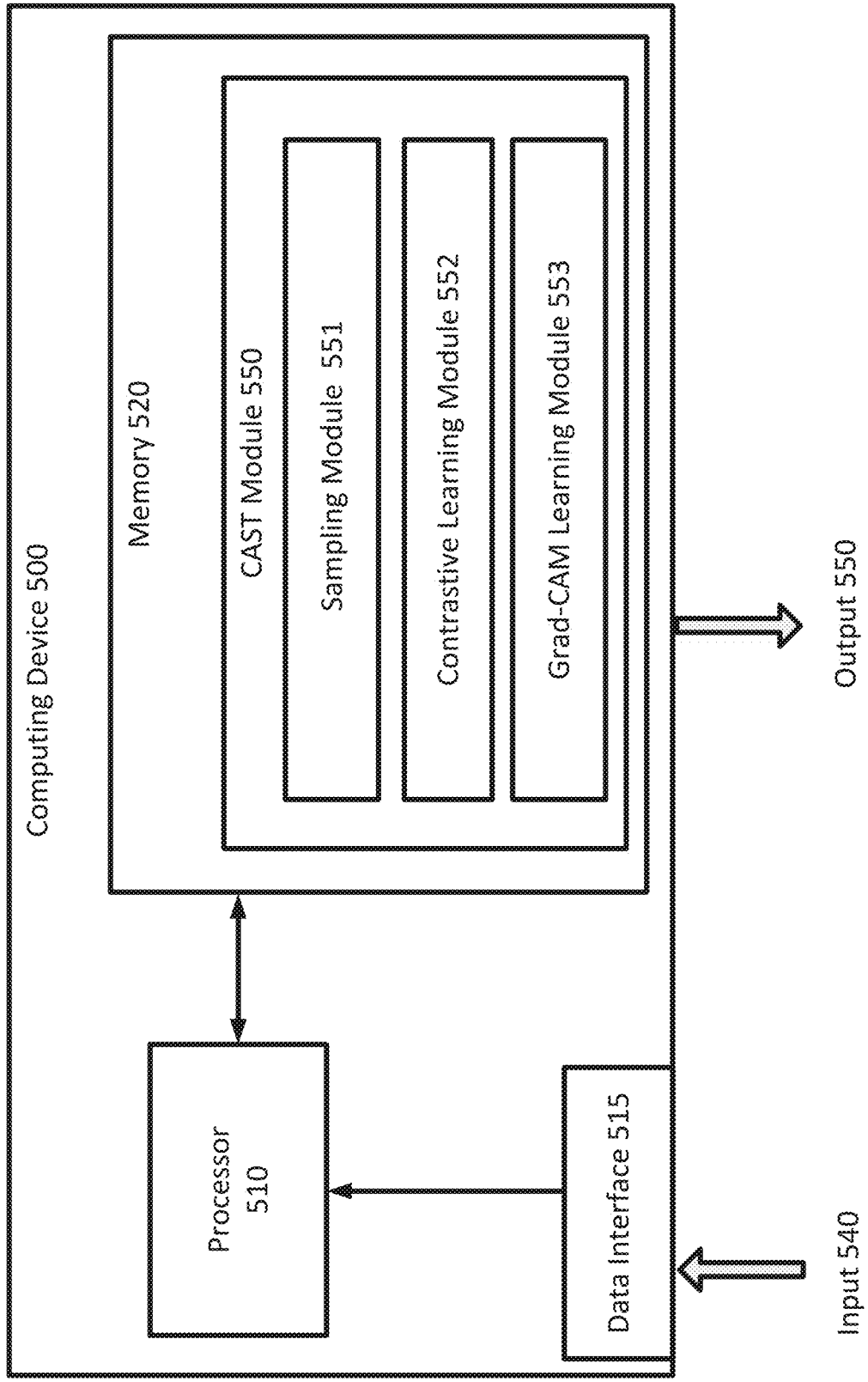
FIG. 5 is a simplified diagram of a computing device for implementing CAST, according to some embodiments.

FIG. 5 is a simplified diagram of a computing device for implementing CAST, according to some embodiments. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for a CAST module 530 that may be used to implement and/or emulate the systems and models, and/or to implement any of the methods described further herein. In some examples, the CAST module 530, may receive an input 540, e.g., such as unlabeled or labeled image samples, via a data interface 515. The data interface 515 may be any of a user interface that receives a user uploaded image sample, or a communication interface that may receive or retrieve a previously stored image sample from the database. The CAST module 530 may generate an output 550 such as classification, object identification, captioning, etc. of the input 540.

In some embodiments, the CAST module 530 may further includes the sampling module 531, a contrastive learning module 532 and a Grad-CAM learning module 533. In some examples, the CAST module 530 and the sub-modules 531-533 may be implemented using hardware, software, and/or a combination of hardware and software. For example, functions and operations of the sampling module 531 may be described in relation to the saliency constrained random crop module 210 discussed in relation to FIGS. 2-3. Functions and operations of the contrastive learning module 532 may be described in relation to the encoder 215, momentum encoder 216a and the contrastive loss module 220 in FIGS. 2 and 4. Functions and operations of the Grad-CAM learning module 533 may be described in relation to the encoder 215, momentum encoder 216b and the attention loss module 230 in FIGS. 2 and 4.

Figure 6:
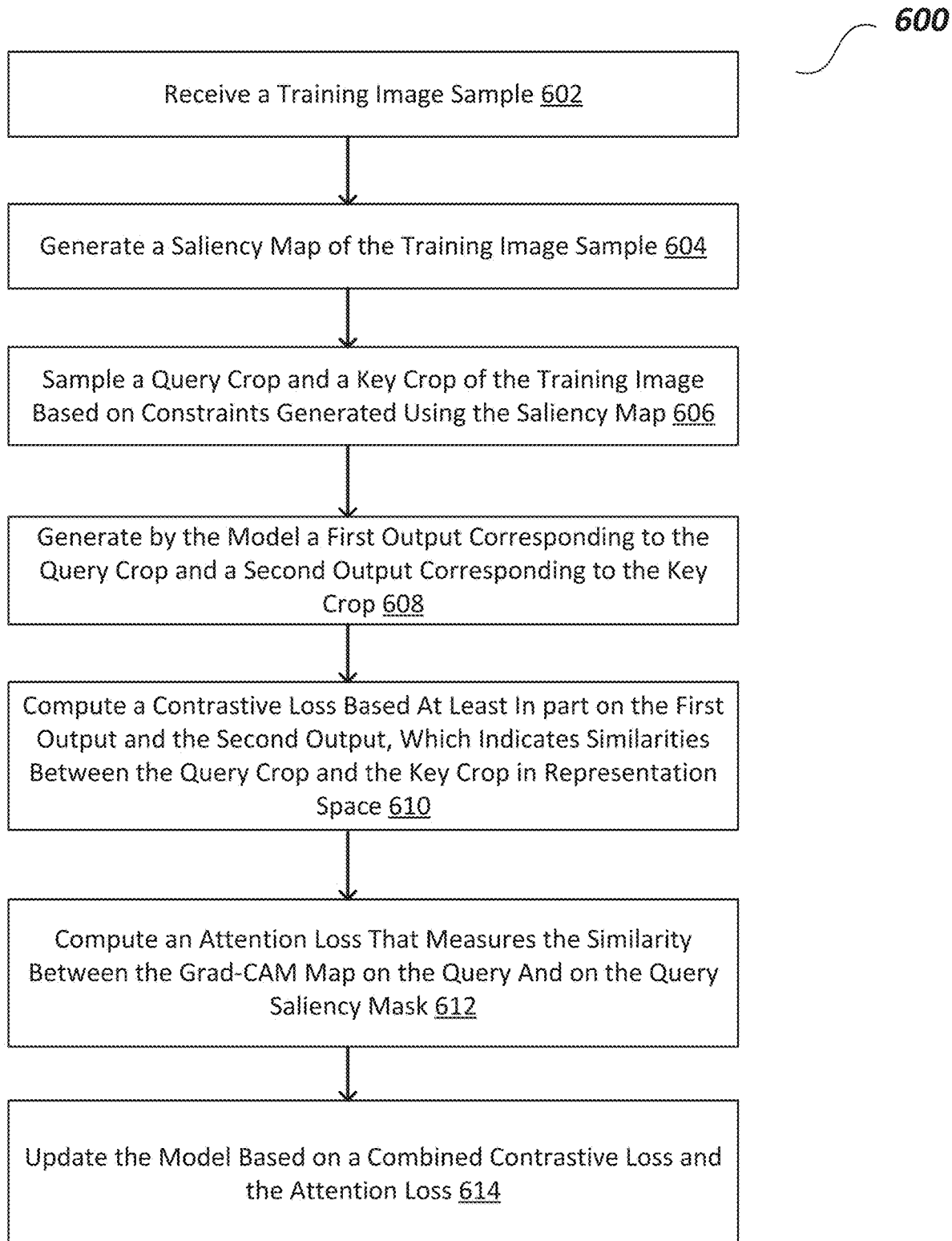
FIG. 6 is a simplified logic flow diagram illustrating a method for CAST learning as shown in the framework in FIG. 2, according to some embodiments described herein.

FIG. 6 is a simplified logic flow diagram illustrating a method for CAST learning as shown in the framework in FIG. 2, according to some embodiments described herein. One or more of the processes 602-614 of method 600 may be implemented, at least in part, in the form of executable code stored on non-transitory, tangible, machine-readable media that when run by one or more processors may cause the one or more processors to perform one or more of the processes 602-614. In some embodiments, method 600 may correspond to the method used by the module 530 in FIG. 5. In some embodiments, one or more of the processes 602-614 of method 600 may be implemented by one or more operations in the pseudocode segment 800 shown in FIG. 8.

At process 602, a training image sample may be received. For example, the training image sample, e.g., an image 202 containing multiple objects, may be received via the data interface 515 shown in FIG. 5.

At process 604, a saliency map may be generated from the training image sample. For example, the saliency map may be generated by Deep-USPS, which uses an unsupervised saliency prediction algorithm which introduces two-stage mechanism for robust unsupervised object saliency prediction, that combines hand-crafted supervision and iterative self-training.

At process 606, a query crop (e.g., 211) and a key crop (e.g., 212) of the training image are randomly sampled subject to constraints generated using the saliency map. In one embodiment, a plurality of key crops generated from a plurality of training image samples may be generated and stored in a dynamic queue. For example, process 606 may be implemented by the pseudocode operations 802 shown in FIG. 8.

At process 608, the model may generate a first output corresponding to the query crop and a second output corresponding to the key crop. For example, a query feature representation 217 and a key feature representation 218 may be generated, respectively. For example, process 608 may be implemented by the pseudocode operations 806 shown in FIG. 8.

At process 610, a contrastive loss may be computed based at least in part on the first output and the second output, which indicates similarities between the query crop and the key crop in representation space. For example, the contrastive loss 222 may be computed based on similarities between the query feature representation 217, and the plurality of key feature representations in the dynamic queue, in the feature representation space. For example, process 610 may be implemented by the pseudocode operation 808 that computes positive and negative logits for positive and negative query-key pairs and operation 810 that computes the contrastive loss based on the computed logits shown in FIG. 8.

At process 612, an attention loss that measures the similarity between the grad-CAM map on the query and on the query saliency mask may be computed. Further details of the Grad-CAM based attention loss may be described in relation to FIG. 7. For example, process 612 may be implemented by the pseudocode operations 812-820 shown in FIG. 8.

At process 614, the model is updated based on a combined contrastive loss and the attention loss. For example, the encoder 215 and/or the momentum encoder 216a may be updated via backpropagation. For example, process 614 may be implemented by the pseudocode operations 822 shown in FIG. 8.

Figure 7:
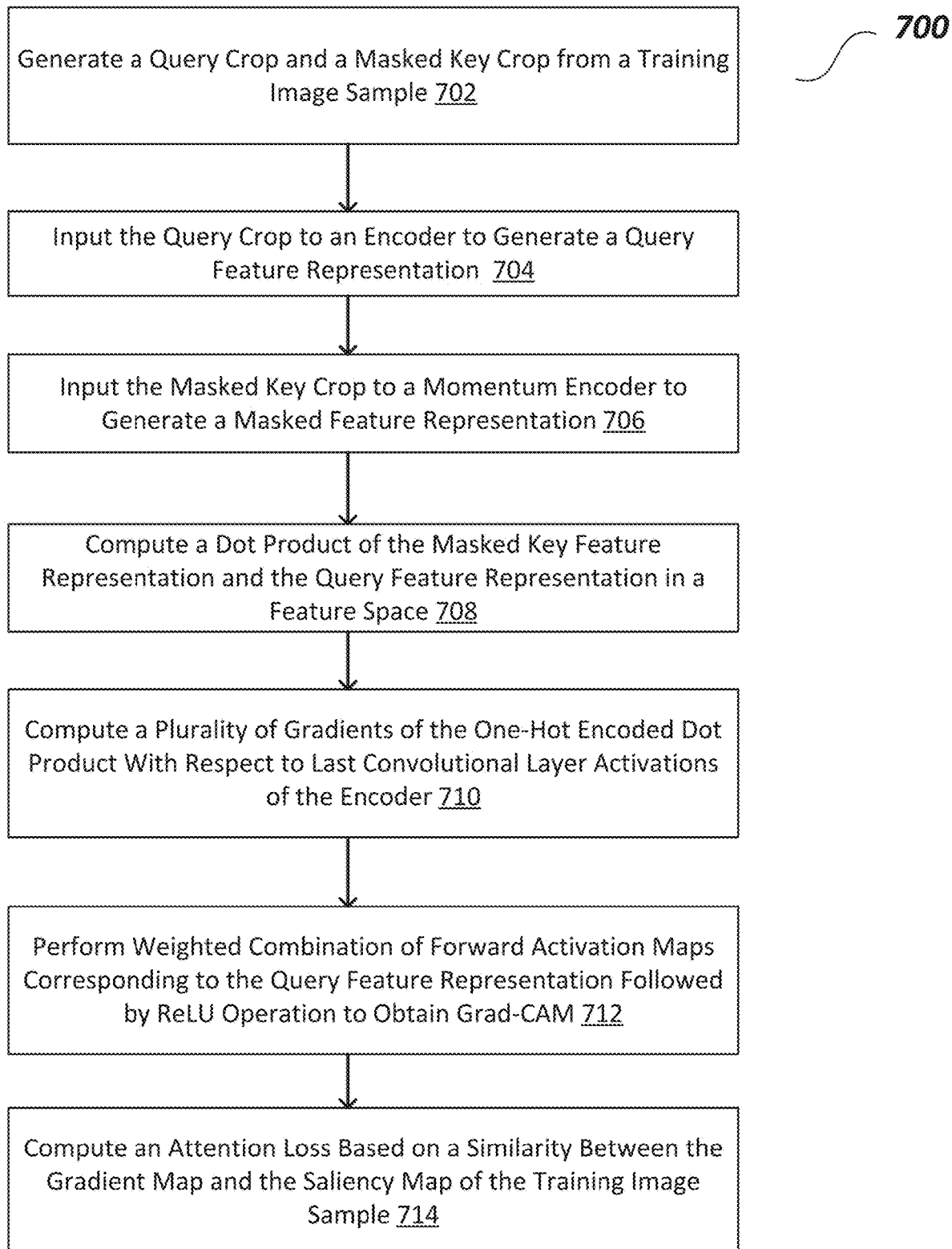
FIG. 7 is a simplified logic flow diagram illustrating a method for CAST learning through a gradient-weighted class activation mapping (Grad-CAM) based attention loss, according to some embodiments described herein.

FIG. 7 is a simplified logic flow diagram illustrating a method for CAST learning through a Grad-CAM based attention loss, according to some embodiments described herein. One or more of the processes 702-714 of method 700 may be implemented, at least in part, in the form of executable code stored on non-transitory, tangible, machine-readable media that when run by one or more processors may cause the one or more processors to perform one or more of the processes 702-714. In some embodiments, method 600 may correspond to the method used by the module 530 in FIG. 5. In some embodiments, one or more of the processes 702-714 of method 700 may be implemented by one or more operations in the pseudocode segment 800 shown in FIG. 8.

At process 702, a query crop (e.g., 211) and a masked key crop (e.g., 213) may be obtained from a training image sample (e.g., 202). For example, the masked key crop may be obtained by masking the background of the visual object in the key crop 212. For example, process 702 may be implemented by the pseudocode operations 812 shown in FIG. 8.

At process 704, the query crop is input to an encoder to generate a query feature representation. For example, process 704 may be implemented by the pseudocode operations 806 shown in FIG. 8.

At process 706, the masked key crop is input to a momentum encoder that is operated in parallel to the encoder, to generate a masked key feature presentation. For example, process 706 may be implemented by the pseudocode operations 812 shown in FIG. 8.

At process 708, a dot product is then computed of the masked key feature representation and the query feature representation in a feature space. For example, process 708 may be implemented by the pseudocode operations 814 shown in FIG. 8.

At process 710, a plurality of gradients of the one-hot encoded dot-product are computed with respect to the last convolutional layer activations of the encoder. For example, process 710 may be implemented by the pseudocode operations 816 shown in FIG. 8.

At process 712, a weighted combination of the forward action maps corresponding to the query feature representation is computed on the plurality of gradients, followed by ReLU operation to obtain Grad CAM map. For example, process 712 may be implemented by the pseudocode operations 818 shown in FIG. 8.

At process 714, an attention loss is computed based on a similarity between the Grad-CAM gradient map (e.g., 226) and the saliency map (e.g., 204) of the training image sample. For example, process 714 may be implemented by the pseudocode operations 820 shown in FIG. 8.

Example Performance

FIGS. 9A-9D provide examples of saliency constrained random crops compared with traditional random crops, according to one embodiment described herein. As shown in FIG. 9(a)-(d), saliency-constrained random crops are more likely to have salient regions that are overlapping between two randomly sampled crops. This can be compared to unconstrained random crops. For example, in the random crops of (a), the stop sign (salient region) is missing from query, however query and key crops from the saliency-constrained random cropping approach contain a part of the stop sign. Similarly in example (b) the salient region corresponding woman is missing from one of the crops, and in (c), the salient regions corresponding to the surfer is not present in both the query and key crops. The crops which do not contain overlapping salient regions (top-row in each subfigure) tend to provide noisy training signal to contrastive approaches forcing them to incorrectly produce similar features for crops containing varying context, e.g., stop sign and sky in (a), surfer and waves in (c), etc. Saliency-constrained random cropping mitigates this problem.

FIG. 10 provides an example table comparing the transfer learning performance on downstream tasks, according to one embodiment described herein. The quality of the learned features by transferring them to four downstream visual recognition tasks: (a) PASCAL VOC linear classification as described in Everingham et al., the pascal visual object classes (VOC) challenge, in proceedings of International Journal of Computer Vision, 2009; (b) ImageNet-1k linear classification as described in Deng et al., Imagenet: A large-scale hierarchical image database, in proceeding of Computer Vision and Pattern Recognition, 2009, (c) PASCAL VOC object detection, (d) COCO instance segmentation as described in Lin et al., Microsoft COCO: Common objects in context, in proceeding of European Conference on Computer Vision, 2014. Consistent with prior SSL research, the downstream tasks involve learning setups where the pretrained network is used as either a frozen feature extractor (a, b), or weight initialization for fine-tuning (c, d).

Baselines models for comparison includes MoCo-COCO+CAST with base-line methods to show the importance of different components of framework 200: 1. Random Init uses no pretrained visual features; 2. MoCo-COCO, without CAST attention loss ($\lambda$=0) and constrained random cropping ($\varphi$=0); 3. MoCo-COCO+Constrained Crop, without CAST attention loss, to observe gains from better cropping alone. All tasks follow the same hyperparameters as VirTex described in Desai et al., Virtex: Learning visual representations from textual annotations, arXiv preprint arXiv:2006.06666, 2020. VirTex uses a similar evaluation setup as the majority of recent work on self-supervised learning including baseline MoCo. Details for each downstream task are provided as below:

PASCAL VOC Linear Classification: trained on VOC07 trainval split and report mAP on test split. The 7×7 spatial grid of 2048-dimensional features is extracted from the last convolutional layer, and downsampled to 2×2 grid via adaptive average pooling. Then, these features are flattened and L2-normalized to yield 8192-dimensional features. Per-class SVMs are trained for costs C ∈ {0.01, 0.1, 1.0, 10.0}, and the best C is selected by 3-fold cross validation. Other SVM hyperparameters are same as Desai et al.

ImageNet-1k Linear Classification: trained on ILSVRC 2012 train split and report top-1 center crop accuracy on the val split. A linear layer is trained on 2048-dimensional global average pooled features extracted from the network. 100 epochs are trained using SGD with momentum 0.9, weight decay 0, and with batch size 256 distributed across 8 Nvidia V100 GPUs. Similar to MoCo, learning rate 30 is used initially, and then is divided by 10 at epochs 60 and 80.

PASCAL VOC Object Detection: trained Faster R-CNN described in Ren et al., Faster R-CNN: Towards real-time object detection with region proposal networks, in proceeding of *NeurIPS*, 2015, with ResNet-50-C4 backbone. The backbone is initialized with pretrained weights, train on trainval07+12 split, and evaluate on test2007 split. It is trained for 24K iterations using SGD with momentum 0.9, batch size 16 (2 per GPU), and weight decay 10-4. A maximum learning rate 0.02 is used, performing linear warmup for first 100 iterations, and divided by 10 at iterations 18K and 22K. The network is fine-tuned end-to-end, with batch normalization layers synchronized across GPUs (SyncBN).

COCO Instance Segmentation: trained on Mask R-CNN models described in He et al., Mask R-CNN, in proceeding of International Conference on Computer Vision, 2017, with ResNet-50-FPN backbones on train2017 split, and evaluate on val2017 split. 2× training schedule is implemented in Detectron2 and fine-tuned with SyncBN in the backbone and FPN layers.

As shown in FIG. 10, MoCo+CAST outperforms MoCo on all downstream tasks, obtaining robust gains on classification, detection, and instance segmentation. The performance improvement is especially large on the VOC detection task, aided by the improved visual grounding in models trained with CAST. The unsupervised saliency-constrained cropping alone outperforms MoCo on VOC07 and VOC-Detection and gets close to MoCo performance on Imagenet-1k and COCO instance segmentation tasks.

FIG. 11 provides example tables illustrating ablation performances of CAST learning, according to embodiments described herein. Ablation studies are conducted on CAST training setup to isolate the effect of our design decisions. In all these comparisons, MoCo-COCO is treated with CAST trained with default hyperparameters as the base model. Downstream performance of all ablations on VOC07 and IN-1k linear classification setups are observed.

Effect of area threshold $\phi$: area-overlap based constraints conditioned on saliency maps for sampling random crops are used, specifying them via an area threshold hyperparameter $\phi$. Here, the downstream performance improvement is observed due to better training supervision from strategically sampled crops—a model is trained with $\phi$=0.0 to recover the default random crop used in MoCo. As shown in FIG. 11(*a*), removing saliency-constrained random cropping hurts performance, indicating that the saliency-constrained random cropping technique indeed provides better training signal.

Effect of loss weighing factor $\lambda$: the CAST loss is a linear combination of contrastive and attention losses. A parameter $\lambda$ is used to scale the attention loss. Here, different values of $\lambda$ with $\lambda \in \{0.0, 1.0, 3.0, 5.0\}$ are used. Note that $\lambda$=0.0 means MoCo-COCO+Constrained Crop. FIG. 11(*b*) shows that non-zero values of $\lambda$ outperform $\lambda$=0.0, indicating that attention loss is important in CAST. Higher $\lambda$ improve performance up to a point—performance improves with $\lambda$=1.0, 3.0, and slightly degrades with $\lambda$=5.0.

Effect of improving underlying MoCo-COCO: CAST can be added to contrastive SSL methods to improve their visual grounding. Here, it is investigated whether improving the underlying SSL method also shows improvements when trained with CAST. MoCo-v2 variant described in Chen et al., Improved baselines with momentum contrastive learning, arXiv preprint arXiv:2003.04297, 2020, replacing the linear projection with a multi-layer perceptron (MLP), inspired by SimCLR described in Chen et al., A simple framework for contrastive learning of visual representations, in International Conference on Machine Learning, 2020. FIG. 11(*c*) shows that MoCo-MLP+CAST matches or exceeds MoCo-COCO+CAST on downstream tasks, indicating that CAST can provide additive improvements over its underlying SSL method.

Effect of suppressing saliency supervision: focusing on salient image regions is important to improve visual grounding. Hence, the model focuses on all the salient regions inside query crop. In contrast to CAST, MoCo-COCO+CAST is trained with reduced supervision in this ablation study, enforcing the model to only look at salient regions inside the inter-section of query and key crops. FIG. 11(*d*) shows that excluding some salient regions from the query crop (lying outside the intersection) significantly hurts downstream performance on multiple tasks. This indicates that looking beyond the common visual content between two crops to solve instance discrimination yields better visual features.

FIG. 12 provides an example table illustrating background challenge performance of CAST, according to embodiments described herein. The Backgrounds Challenge described in Xiao et al., Noise or signal: the role of image backgrounds in object recognition, arXiv preprint arXiv:

2006.09994, 2020, aims to assess the background-robustness of image classification models by measuring their accuracy on images containing foreground objects superimposed on various background types. The dataset consists of 9 ImageNet classes with 450 test images per class. The performance of COCO-pretrained models are evaluated on the Backgrounds Challenge using a linear layer trained with ImageNet-1K using three settings: 1. MoCo, 2. MoCo trained with saliency-constrained random cropping alone, 3. MoCo trained with CAST (as shown in FIG. 12). Models trained with cropping constrains and with CAST outperform vanilla MoCo on all eight set-tings of the Backgrounds Challenge, with CAST obtaining the best performance on the five settings where fore-ground is present. In the Only-FG setting, where back-ground is set to black, CAST obtains an absolute improvement of 13% over MoCo, indicating that CAST is significantly better at utilizing the foreground information, due to the saliency-driven attention-supervised training. In settings where background is swapped (Mixed-Same, Mixed-Rand, and Mixed-Next), CAST obtains 5-10% absolute improvements, indicating that models trained with CAST are less dependent on background correlations. Finally, in set-tings that do not contain foreground objects (No-FG, Only-BG-B, and Only-BG-T), CAST performs slightly worse than the original model.

Figure 13:
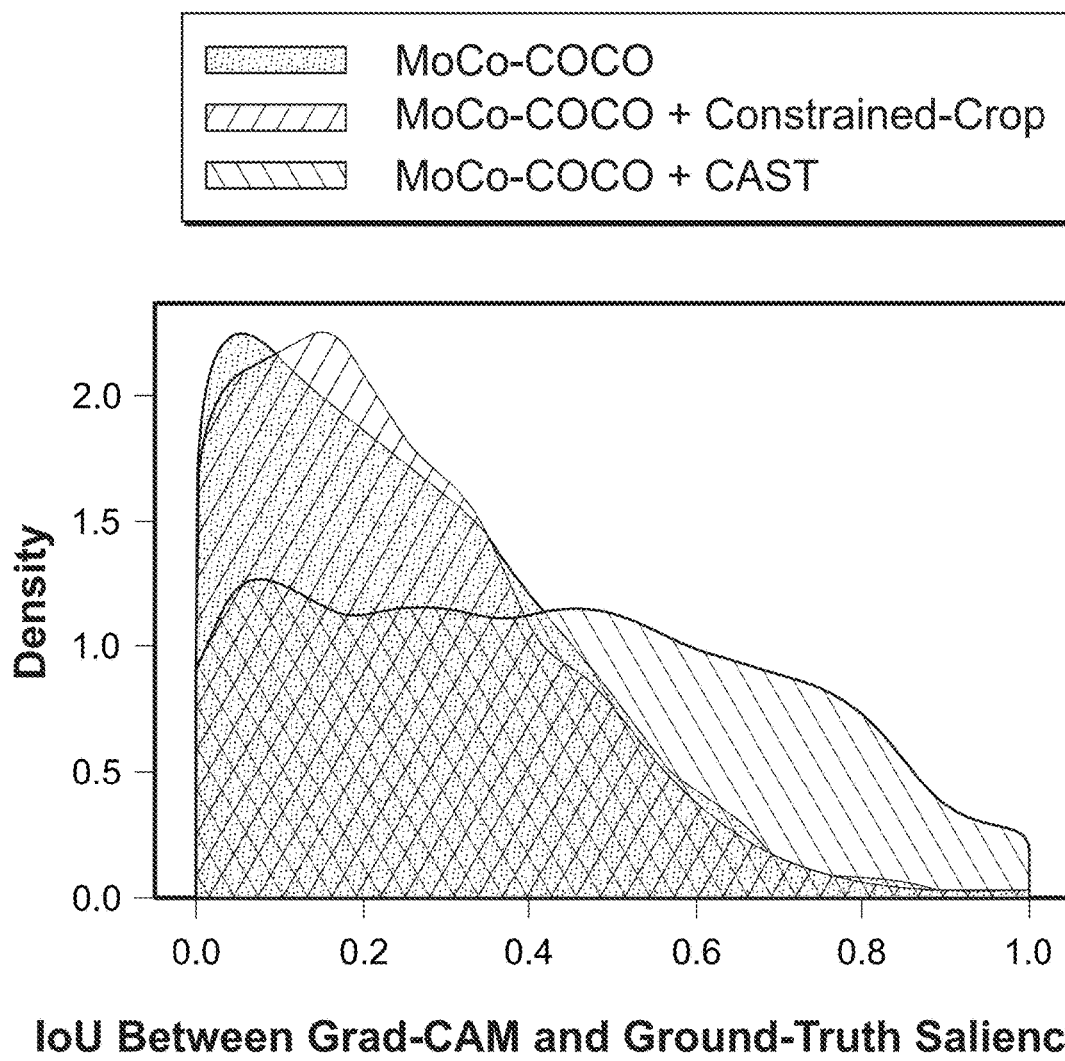
FIG. 13 provide an example data plot illustrating a comparison between CAST and base models in grounding performance, according to embodiments described herein.

FIG. 13 provide an example data plot illustrating a comparison between CAST and base models in Grad-CAM performance, according to embodiments described herein. Grad-CAM is used for qualitative and quantitative evaluation of the visual grounding ability of a contrastive SSL model trained with CAST and its effect on grounding in downstream tasks. The improvement in grounding due to CAST may be quantified using the COCO val split. First, the Grad-CAM maps are binarized by thresholding at 0.5. The intersection over union (IoU) is computed between the Grad-CAM map and the saliency map corresponding to the query image. FIG. 13 shows the density of IoU values for the baseline MoCo-COCO, MoCO-COCO with constrained cropping and MoCO-COCO with CAST. The mean IoU of the MoCo model trained with CAST over the COCO val set is 0.41, substantially larger than the mean IoU of the model trained without CAST, which is 0.24. Moreover, the improvement in grounding ability is largely driven by the gradient-based localization supervision loss, as the mean IoU of a model trained with saliency-driven cropping constraints alone is also 0.24.

Some examples of computing devices, such as computing device 300 may include non-transitory, tangible, machine readable media that include executable code that when run by one or more processors (e.g., processor 310) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for contrastive attention-supervised tuning, the method comprising:
receiving a training image sample;
generating, by an encoder, a query feature representation from a query crop of the training image sample;
generating, by a momentum encoder that is operated in parallel to the encoder, a masked key feature presentation from a masked key crop of the training image sample, wherein the masked key crop contains a visual object while masking a background to the visual object in the training image sample;
computing a dot product of the masked key feature representation and the query feature representation in a feature space;
computing a gradient map based at least in part on a gradient of the dot product and forward activation maps corresponding to the query feature representation, wherein the gradient map is computed by performing weighted combination of forward activation maps corresponding to the query feature representation, followed by a ReLU operation;
computing an attention loss based on a similarity between the gradient map and a saliency map of the training image sample; and
jointly updating the encoder and the momentum encoder based at least in part on the attention loss.

2. The method of claim 1, wherein the masked key crop is obtained based on a saliency map of the training image sample, the saliency map indicative of a salient region that contain the visual object.

3. The method of claim 1, wherein the dot product is one-hot encoded, and the gradient map is computed based on a plurality of gradients of the one-hot encoded dot product with respect to last convolutional layer activations of the encoder.

4. The method of claim 1, further comprising:
generating, by the momentum encoder that is operated in parallel to the encoder, a plurality of key feature representations in response to a plurality of key crops of the training image samples; and
storing the plurality of key feature representations in a queue.

5. The method of claim 4, further comprising:
computing a contrastive loss based on similarities between the query feature representation and the plurality of key feature representations in a feature space.

6. The method of claim 5, further comprising:
computing a weighted sum of the contrastive loss and the attention loss; and
jointly updating the encoder and the momentum encoder based on the weighted sum via backpropagation.

7. The method of claim 1, further comprising:
generating, from the training image sample, a saliency map in a form of a binary mask indicating a plurality of salient regions in the training image sample;
generating a first random crop of the training image sample subject to a crop constraint that the first random crop overlaps with one or more salient regions in the saliency map for more than an area-overlap threshold; and
sending the first random crop to the encoder as the query crop.

8. The method of claim 7, further comprising:
generating a plurality of random crop of the training image subject to the crop constraint;
sending the plurality of random crops to the momentum encoder as a plurality of key crops.

9. A system for contrastive attention-supervised tuning, the system comprising:
a data interface that receives a training image sample;
a memory that stores a plurality of processor-executable instructions; and
a processor that reads and executes the plurality of processor-executable instructions from the memory to perform:
generating, by an encoder, a query feature representation from a query crop of the training image sample;
generating, by a momentum encoder that is operated in parallel to the encoder, a masked key feature presentation from a masked key crop of the training image sample, wherein the masked key crop contains a visual object while masking a background to the visual object in the training image sample;
computing a dot product of the masked key feature representation and the query feature representation in a feature space;
computing a gradient map based at least in part on a gradient of the dot product and forward activation maps corresponding to the query feature representation, wherein the gradient map is computed by performing weighted combination of forward activation maps corresponding to the query feature representation, followed by a ReLU operation;
computing an attention loss based on a similarity between the gradient map and a saliency map of the training image sample; and
jointly updating the encoder and the momentum encoder based at least in part on the attention loss.

10. The system of claim 9, wherein the masked key crop is obtained based on a saliency map of the training image sample, the saliency map indicative of a salient region that contain the visual object.

11. The system of claim 9, wherein the dot product is one-hot encoded, and the gradient map is computed based on a plurality of gradients of the one-hot encoded dot product with respect to last convolutional layer activations of the encoder.

12. The system of claim 9, wherein the processor reads the plurality of processor-executable instructions to further perform:
generating, by the momentum encoder that is operated in parallel to the encoder, a plurality of key feature representations in response to a plurality of key crops of the training image samples; and
storing the plurality of key feature representations in a queue.

13. The system of claim 12, wherein the processor reads the plurality of processor-executable instructions to further perform:
computing a contrastive loss based on similarities between the query feature representation and the plurality of key feature representations in a feature space.

14. The system of claim 13, wherein the processor reads the plurality of processor-executable instructions to further perform:
computing a weighted sum of the contrastive loss and the attention loss; and
jointly updating the encoder and the momentum encoder based on the weighted sum via backpropagation.

15. The system of claim 9, wherein the processor reads the plurality of processor-executable instructions to further perform:
generating, from the training image sample, a saliency map in a form of a binary mask indicating a plurality of salient regions in the training image sample;
generating a first random crop of the training image sample subject to a crop constraint that the first random crop overlaps with one or more salient regions in the saliency map for more than an area-overlap threshold; and
sending the first random crop to the encoder as the query crop.

16. The system of claim 15, wherein the processor reads the plurality of processor-executable instructions to further perform:
generating a plurality of random crop of the training image subject to the crop constraint;
sending the plurality of random crops to the momentum encoder as a plurality of key crops.

17. A non-transitory processor-readable storage medium storing a plurality of processor-executable instructions for contrastive attention-supervised tuning, the instructions being executed by a processor to perform operations comprising:
receiving a training image sample;
generating, by an encoder, a query feature representation from a query crop of the training image sample;
generating, by a momentum encoder that is operated in parallel to the encoder, a masked key feature presentation from a masked key crop of the training image sample, wherein the masked key crop contains a visual object while masking a background to the visual object in the training image sample;
computing a dot product of the masked key feature representation and the query feature representation in a feature space;
computing a gradient map based at least in part on a gradient of the dot product and forward activation maps corresponding to the query feature representation, wherein the gradient map is computed by performing weighted combination of forward activation maps corresponding to the query feature representation, followed by a ReLU operation;

computing an attention loss based on a similarity between the gradient map and a saliency map of the training image sample; and jointly updating the encoder and the momentum encoder based at least in part on the attention loss.

18. The medium of claim 17, wherein the masked key crop is obtained based on a saliency map of the training image sample, the saliency map indicative of a salient region that contain the visual object.

* * * * *